US012591651B2

(12) United States Patent
Reddy et al.

(10) Patent No.: US 12,591,651 B2
(45) Date of Patent: Mar. 31, 2026

(54) DATA STORAGE DEVICE AND METHOD OF ACCESS WITH USER FINGERPRINT

(71) Applicant: Sandisk Technologies, Inc., Milpitas, CA (US)

(72) Inventors: Ankilla Mahipal Reddy, Bangalore (IN); Shubhi Khanna, Bangalore (IN); Ramanathan Muthiah, Bangalore (IN); Adithya Vasudevan, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 121 days.

(21) Appl. No.: 18/735,182

(22) Filed: Jun. 6, 2024

(65) Prior Publication Data

US 2025/0378149 A1     Dec. 11, 2025

(51) Int. Cl.
| | |
|---|---|
| *G06F 21/32* | (2013.01) |
| *G06F 12/14* | (2006.01) |
| *G06F 21/62* | (2013.01) |

(52) U.S. Cl.
CPC .......... *G06F 21/32* (2013.01); *G06F 12/1483* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 6,539,380 | B1 | 3/2003 | Moran |
| 8,000,502 | B2 | 8/2011 | Dave et al. |
| 8,166,067 | B2 | 4/2012 | Hahn |
| 10,181,041 | B2 | 1/2019 | Bhansali et al. |
| 11,868,635 | B2 | 1/2024 | Jayaraman et al. |
| 2021/0326054 | A1* | 10/2021 | Jayaraman .............. G06F 21/36 |
| 2022/0327245 | A1 | 10/2022 | Agrawal et al. |

* cited by examiner

*Primary Examiner* — Boris D Grijalva Lobos
(74) *Attorney, Agent, or Firm* — Patent Law Works LLP

(57) ABSTRACT

A data storage device comprising: a storage medium; a communication interface to enable communication with a host device; and a flash translation layer (FTL) module. The FTL module is configured to: receive a fingerprint key of an enrolled user from a fingerprint sensor; determine selective access restrictions of the enrolled user based on the fingerprint key; and in response, enable the host device selective access to user data in the storage medium in accordance with the selective access restrictions. Selective access is enabled by receiving a corresponding portion of a logical to physical (L2P) table associated with the selective access restrictions of the enrolled user.

20 Claims, 12 Drawing Sheets

100

110

Receive a fingerprint key of a user from a fingerprint sensor

120

Determine selective access restrictions of the user based on the fingerprint key

130

In response, enable selective access to the storage medium in accordance with the selective access restrictions Receiving a corresponding portion of a logical to physical table associated with the selective access restrictions of the user

140

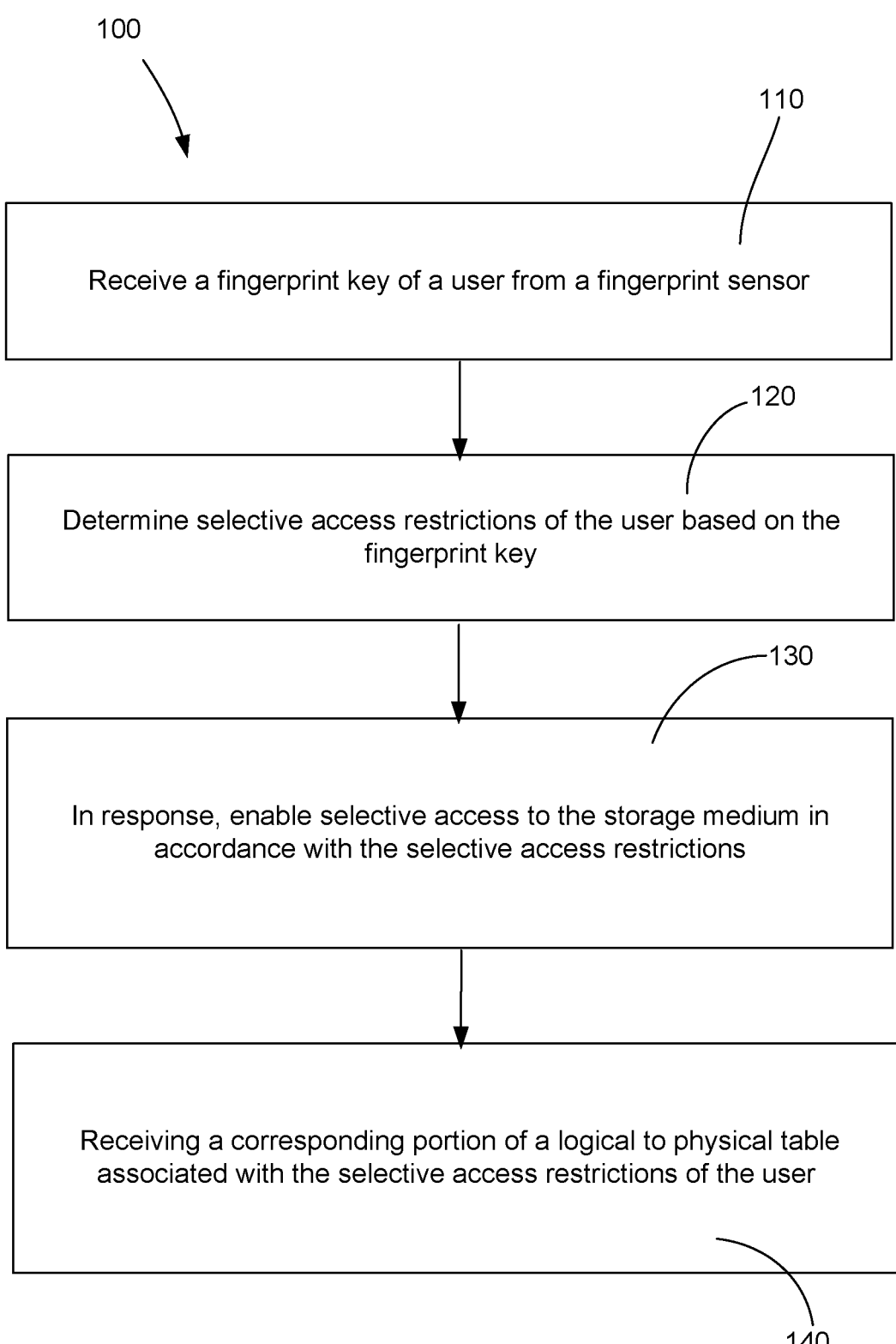

100

110

Receive a fingerprint key of a user from a fingerprint sensor

120

Determine selective access restrictions of the user based on the fingerprint key

130

In response, enable selective access to the storage medium in accordance with the selective access restrictions Receiving a corresponding portion of a logical to physical table associated with the selective access restrictions of the user

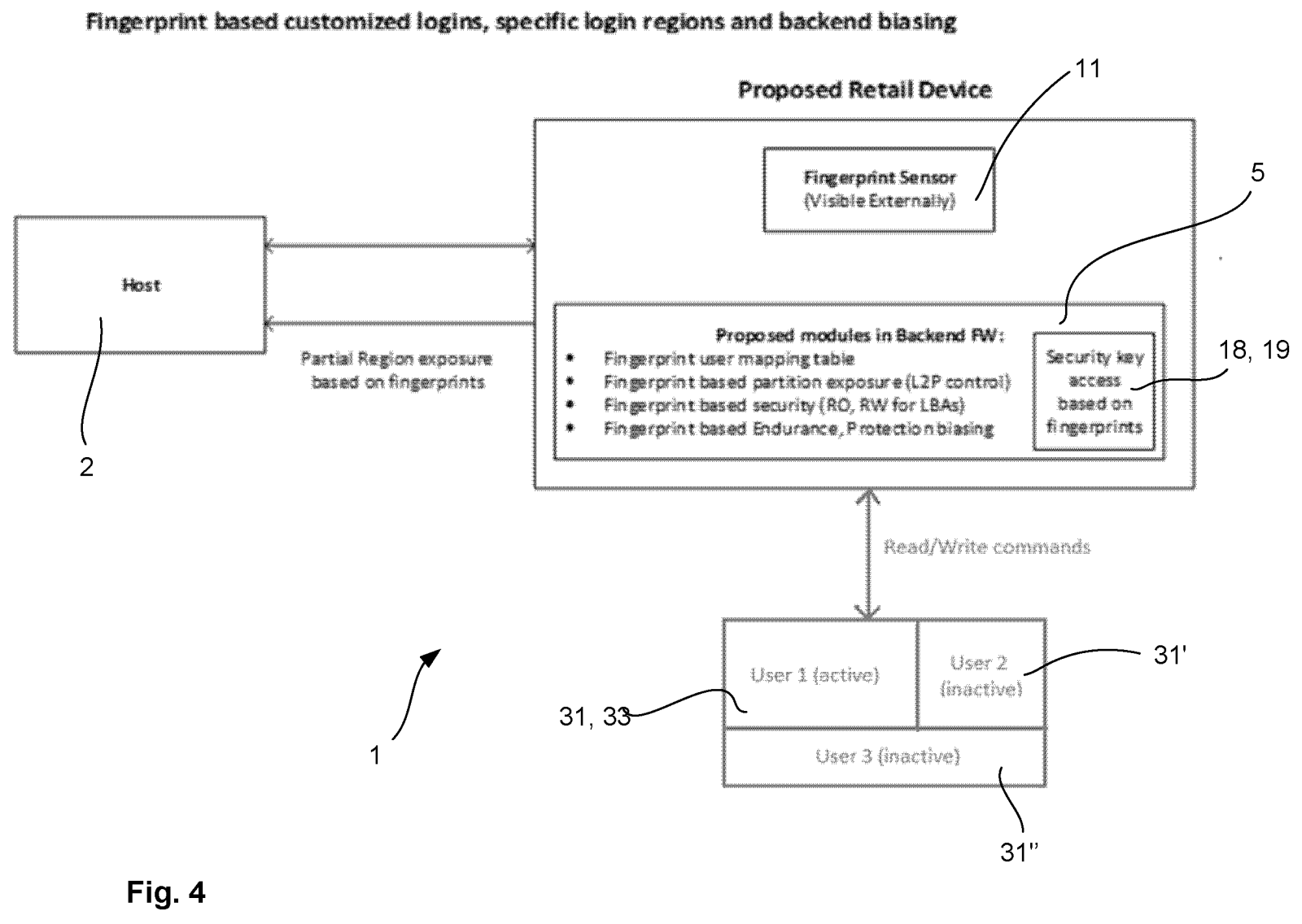

Fingerprint based customized logins, specific login regions and backend biasing

Proposed Retail Device

Fingerprint Sensor
(Visible Externally)

Security key
access
based on
fingerprints

Proposed modules in Backend RW:

Fingerprint user mapping table
Fingerprint based partition exposure (L2P control)
Fingerprint based security (RO, RW for LBAs)
Fingerprint based Endurance, Protection biasing Host Partial Region exposure
based on fingerprints Read/Write commands User 1 (active)

User 2
(inactive)

User 3 (inactive)

Fig. 4

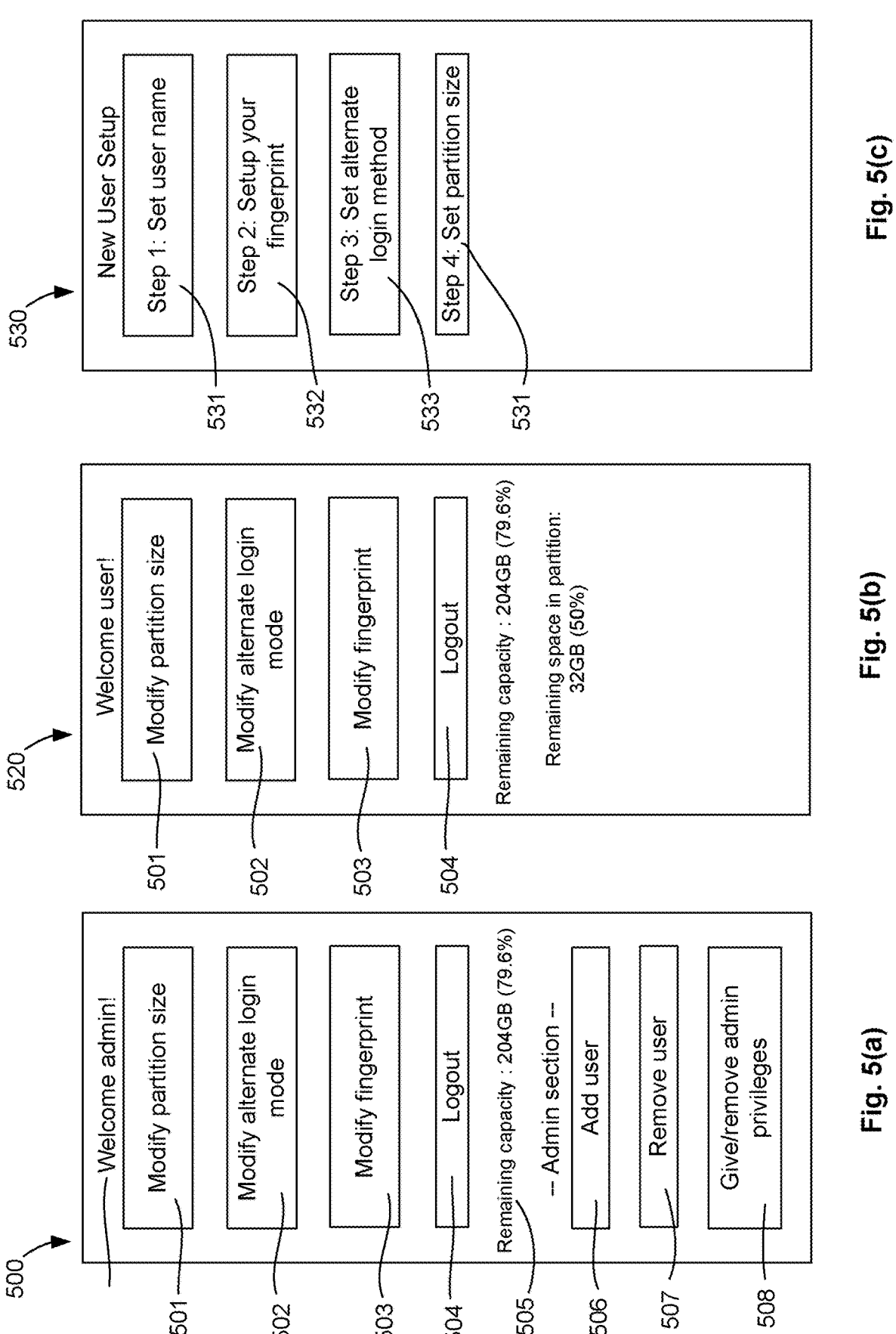

New User Setup

Step 1: Set user name 531

Step 2: Setup your fingerprint 532

Step 3: Set alternate login method 533

Step 4: Set partition size 531

Welcome user!

Modify partition size 501

Modify alternate login mode 502

Modify fingerprint 503

Logout 504

Remaining capacity : 204GB (79.6%)

Remaining space in partition: 32GB (50%)

Welcome admin!

Modify partition size 501

Modify alternate login mode 502

Modify fingerprint 503

Logout 504

Remaining capacity : 204GB (79.6%) 505

-- Admin section --

Add user 506

Remove user 507

Give/remove admin privileges 508

Figures 6A, 6B, 6C:
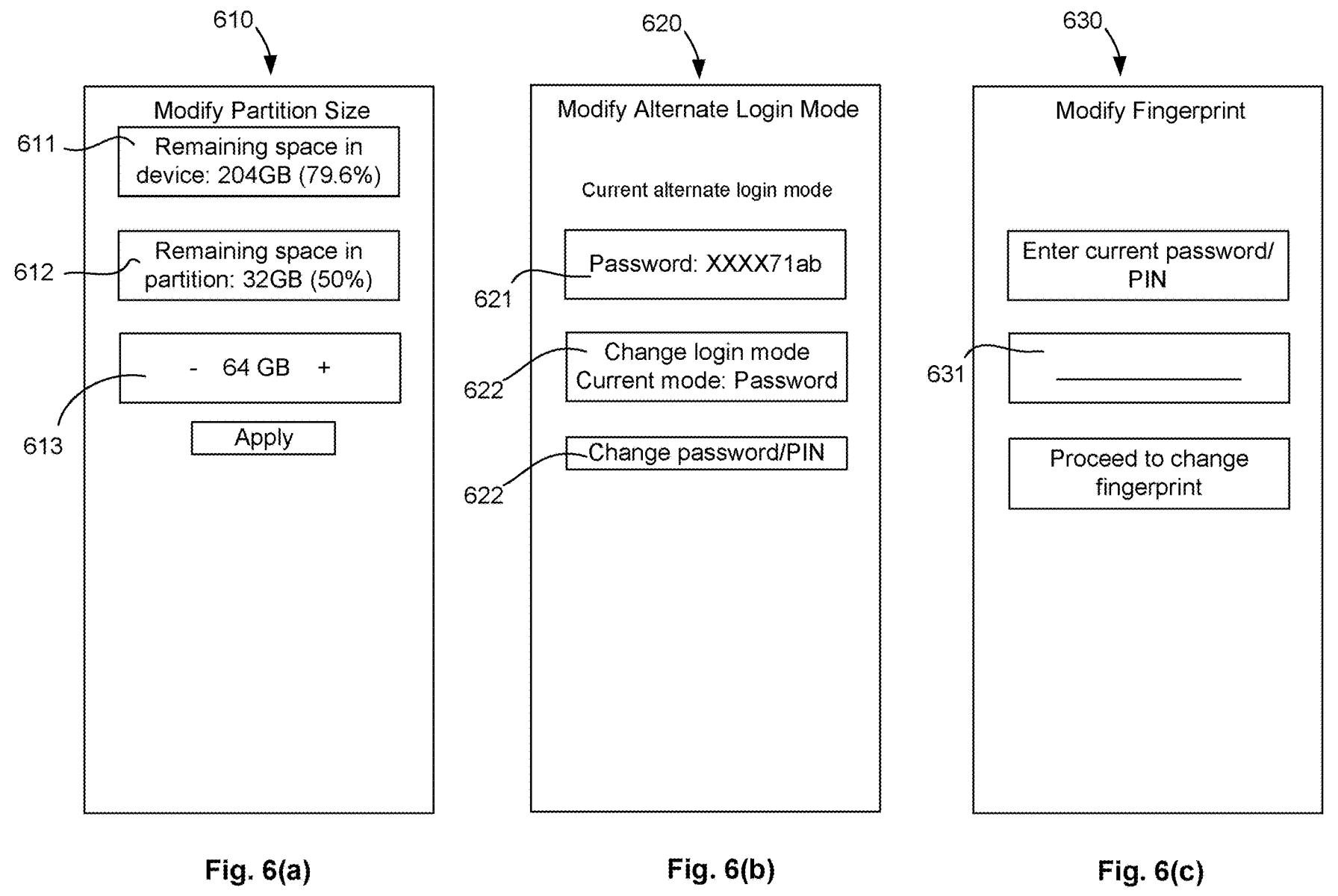

Modify Fingerprint

Enter current password/ PIN

631

Proceed to change fingerprint

Modify Alternate Login Mode

Current alternate login mode

621 — Password: XXXX71ab

622 — Change login mode
Current mode: Password

622 — Change password/PIN

Modify Partition Size

611 — Remaining space in device: 204GB (79.6%)

612 — Remaining space in partition: 32GB (50%)

613 — −  64 GB  +

Apply

Determine, based on the selective access restrictions of the enrolled user, one or more operating protocols associated with the selective access restrictions

132

Execute, one or more operating protocols

100

140

124

Determine, based on the selective access restrictions of the enrolled user, one or more firmware associated with the selective access restrictions

134

Execute, firmware

100

140

126

Determine, based on the selective access restrictions of the enrolled user, one or more data protection operation modes associated with the selective access restrictions

136

Operate the data protection operating mode

DATA STORAGE DEVICE AND METHOD OF ACCESS WITH USER FINGERPRINT

TECHNICAL FIELD

The present disclosure relates to a secure data storage device and method to securely access user data in a storage medium.

BACKGROUND

It is important to protect confidential data from a data storage device. Without protection, one can steal or access confidential data from a data storage device (such as a portable or external device) left unattended by simply copying the confidential data from the data storage device to another storage medium.

Data storage devices may be password protected where the contents of the entire drive may be password protected. Once a login is enabled, such as by entering a password, this provides access to all user data in the data storage device.

In some examples, a data storage device may have multiple partitions or namespaces. This may be useful to separate data of different users of the same data storage device.

SUMMARY

A data storage device comprising: a storage medium; a communication interface to enable communication with a host device; and a flash translation layer (FTL) module, wherein the FTL module is configured to: receive a fingerprint key of an enrolled user from a fingerprint sensor; determine selective access restrictions of the enrolled user based on the fingerprint key; and in response, enable the host device selective access to user data in the storage medium in accordance with the selective access restrictions. Selective access is enabled by receiving a corresponding portion of a logical to physical (L2P) table associated with the selective access restrictions of the enrolled user. Access is disabled to other portions of the L2P table associated with selective access restrictions of other users.

In some examples, the data storage device is configured with at least one user partition for the enrolled user, wherein the at least one user partition is a logical partition defined by the corresponding portion in the L2P table.

In some examples of the data storage device, the selective access restrictions specify physical blocks, and/or characteristics of physical blocks, in the storage medium to store at least part of the user data, and wherein the specified physical blocks are defined in the corresponding portion in the L2P table.

In some examples of the data storage device, the specified physical blocks are selected based on respective block health relative to health of a plurality of physical blocks in the storage medium.

In some examples of the data storage device, the FTL module is further configured to: determine, based on the selective access restrictions of the enrolled user, one or more operating protocols associated with the selective access restrictions. The operating protocols are associated with respective functions of the data storage device. In response to the determined one or more operating protocols, the data storage device is configured to enable execution of the one or more operating protocols.

In some examples of the data storage device, the operating protocols include one or more of: one or more specified communication protocol(s) to enable communication between the data storage device and the host device; one or more specified physical communication modes to enable communication between the data storage device and the host device; and one or more specified operating modes based on specified preferences.

In some examples of the data storage device, the FTL module is further configured to: determine, based on the selective access restrictions of the enrolled user, one or more firmware associated with the selective access restrictions; wherein in response to the determined one or more firmware, the data storage device is configured to enable execution of the one or more firmware.

In some examples of the data storage device, the FTL module is further configured to: determine, based on the selective access restrictions of the enrolled user, one or more data protection operation modes associated with the selective access restrictions, wherein in response to the determined data protection operating mode, the data storage device is configured to enable operation of the determined data protection operating mode.

In some examples of the data storage device, the FTL module is further configured to: determine, based on the selective access restrictions of the enrolled user, one or more garbage collection preferences associated with the selective access restrictions, wherein in response to the determined garbage collection preferences, the data storage device is configured to enable operation of the determined garbage collection preferences.

In some examples, the data storage device further comprises the fingerprint sensor, wherein the fingerprint sensor is configured to send the fingerprint key of the user to the FTL module.

In some examples the data storage device is further configured to receive the fingerprint key of the user from the fingerprint sensor associated with the host device.

There is also provided a computer-implemented method for selectively enabling access to user data in a storage medium, the method comprising: receiving a fingerprint key of an enrolled user from a fingerprint sensor; determining selective access restrictions of the enrolled user based on the fingerprint key; and in response to determining selective access restrictions, enabling selective access to user data in the storage medium in accordance with the selective access restrictions. Selective access is enabled by a flash translation layer (FTL) module receiving a corresponding portion of a logical to physical (L2P) table associated with the selective access restrictions of the user; and wherein access is disabled to other portions of the L2P table associated with selective access restrictions of other users.

In some examples of the computer-implemented method, selective access restrictions of the enrolled user includes access to at least one user partition for the enrolled user, wherein the one user partition is a logical partition defined by the corresponding portion in the L2P table, wherein the method comprises: reading, writing, or erasing user data in the logical partition based on mapping with the corresponding portion in the L2P table.

In some examples of the computer-implemented method, the selective access restrictions specify physical blocks in the storage medium to store at least part of the user data, and the method comprises: reading, writing, or erasing user data in physical blocks specified by the selective access restrictions, wherein the physical blocks are defined in the corresponding portion in the L2P table.

In some examples, the computer-implemented method further comprises: selecting one or more specified physical blocks, from a plurality of physical blocks in the storage medium, based on respective block health relative to health of the plurality of physical blocks in the storage medium.

In some examples, the computer-implemented method further comprises determining, based on the selective access restrictions of the enrolled user, one or more operating protocols associated with the selective access restrictions, wherein the operating protocols are associated with respective functions of the data storage device. In response to the determined one or more operating protocols, the method further comprises executing the one or more operating protocols.

In some examples, the computer-implemented method further comprises: determining, based on the selective access restrictions of the enrolled user, one or more firmware associated with the selective access restrictions; wherein in response to the determined one or more firmware, the method further comprises executing the one or more firmware.

In some examples, the computer-implemented method further comprises: determining, based on the selective access restrictions of the enrolled user, one or more data protection operation modes associated with the selective access restrictions, wherein in response to the determined data protection operating mode, the method further comprises operating the determined data protection operating mode.

In some examples, the computer-implemented method further comprises: determining, based on the selective access restrictions of the enrolled user, one or more garbage collection preferences associated with the selective access restrictions, wherein in response to the determined garbage collection preferences, the method further comprises operating the determined garbage collection preferences.

There is provided a data storage device comprising: means for storing data; means for receiving a fingerprint key of a user; means for determining selective access restrictions of the user based on the fingerprint key; and in response to determining selective access restrictions, means for enabling selective access to user data in the storage medium in accordance with the selective access restrictions. Selective access is enabled by providing a corresponding portion of a logical to physical (L2P) table associated with selective access restriction of the user; and wherein access is disabled to other portions of the L2P table associated with selective access restrictions of other users.

BRIEF DESCRIPTION OF DRAWINGS

FIG. 2 is a flow diagram of a method to selectively enable access to user data in a storage medium based on a fingerprint key in accordance with one example;

FIG. 4 is a schematic of a system including a data storage device with a fingerprint sensor in communication with a host device in accordance with another example;

FIG. 5(a) is a graphical user interface at the host device for an admin to change settings;

FIG. 5(b) is a graphical user interface at the host device for a user to change settings;

FIG. 5(c) is a graphical user interface at the host device to setup a new user;

FIG. 6(a) is a graphical user interface at a host device for a user to set or modify a partition size;

FIG. 6(b) is a graphical user interface at the host device for a user to set or modify an alternate login mode;

FIG. 6(c) is a graphical user interface at the host device for a user to modify a fingerprint associated with access to the data storage device;

DESCRIPTION OF EMBODIMENTS

In the following detailed description, various aspects of a data storage device in communication with a host device will be presented. These aspects are suited for flash storage devices, such as SSDs (solid-state drive) and SD (Secure Digital) cards. However, those skilled in the art will realize that these aspects may be extended to other types of data storage devices capable of storing data. In yet further examples, the data storage device can be a combination of flash memory and magnetic storage such as a hybrid drive. Accordingly, any reference to a specific apparatus or method is intended only to illustrate the various aspects of the present disclosure, with the understanding that such aspects may have a wide range of applications without departing from the spirit and scope of the present disclosure.

Overview

Figure 1:
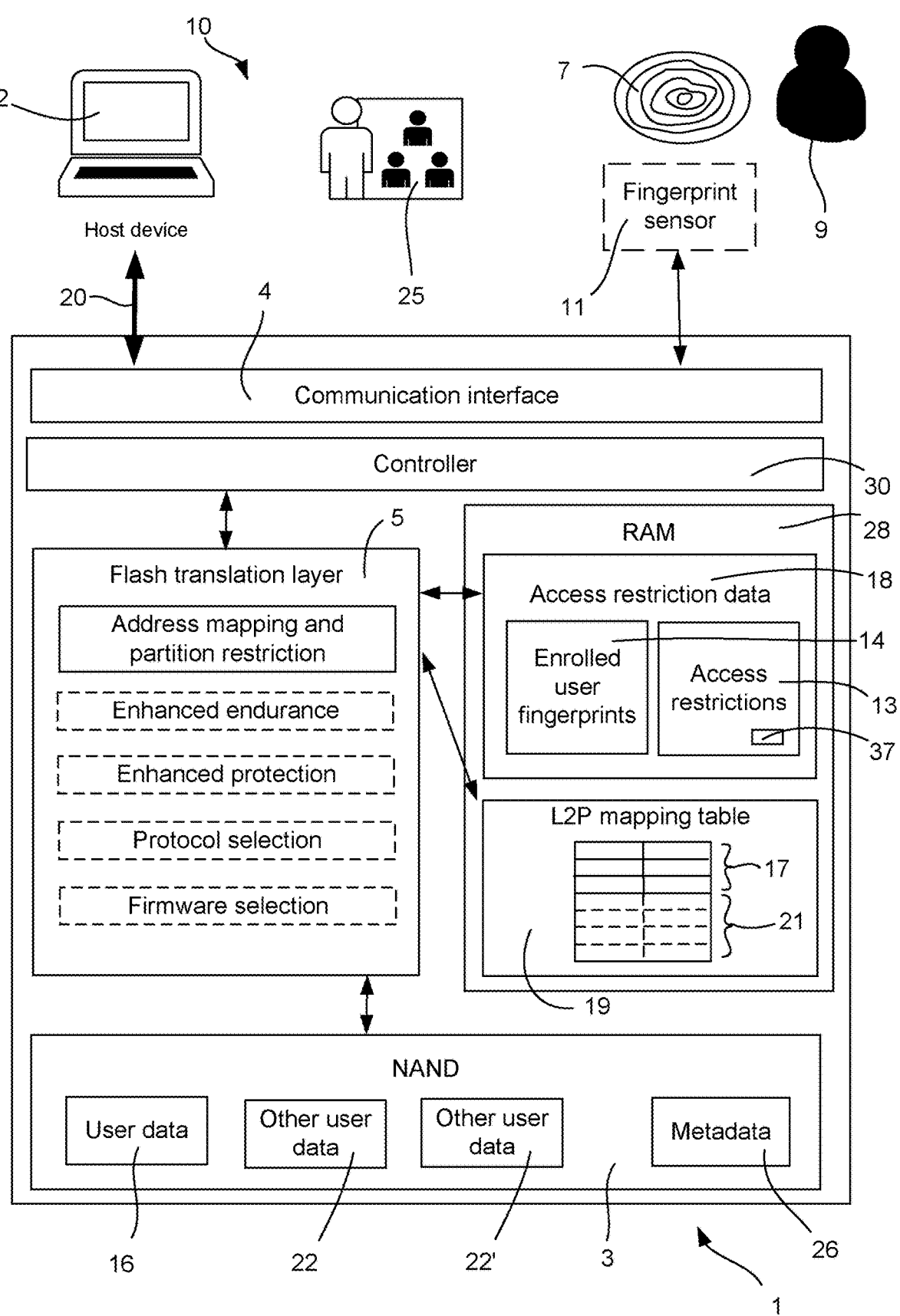
FIG. 1 is a schematic of a system including a data storage device in communication with a host device in accordance with one example.

FIG. 1 illustrates a system 10 including a data storage device (DSD) 1 that is in communication with a host device 2.

The host device 2 and the data storage device 1 may form part of a system 10, such as a computer system (e.g. server, desktop, laptop, tablet, smartphone, etc.). In this illustrated example, the components of FIG. 1 are physically co-located. However, in other examples the host device may be located remotely from the data storage device.

The system 10 and method 100 disclosed herein enables the data storage device 1 to be used by an enrolled user 9 in a secure manner where a fingerprint key 7, provided by a finger of an enrolled user 9 at a fingerprint sensor 11, can be used to initiate a session between the host device 2 and the data storage device 1 with selective access restriction 13 corresponding to that particular enrolled user.

In some examples, such selective access restrictions 13 include a partition of the data storage device 1 to be used exclusively for user data 16 of that enrolled user 9. The enrolled user 9 does not have access to the partitions of other enrolled users 25 and their respective other user data 22. Conversely, other users 25 do not have access to the user data 16 in the partition of the enrolled user 9. This can advantageously enable the data storage device 1 to be shared amongst a group of users so that they can individually use the DSD 1 during their own respective sessions, whilst preventing users from accessing user data of other users.

The data storage device 1 includes a data storage medium 3, such as flash memory, to store user data 16, 22. A communication interface 4 is provided to facilitate communication between the data storage device 1 and the host device 2, which in some examples includes communication via a physical cable and in other examples wireless communication. A fingerprint sensor 11, is provided to receive biometrics of a user such as fingerprint data that can be used as, or used to derive, a fingerprint key 7. In some examples, the fingerprint sensor 11 is part of the data storage device 1.

A flash translation layer (FTL) module 5 is configured to perform at least part of the method 100 illustrated in FIG. 2. The FTL module 5 may be implemented, at least in part, by a controller 30 executing firmware or software operations. Referring to FIG. 2, the method 100 includes receiving 100 a fingerprint key 7 of the enrolled user 9 from the fingerprint sensor; and determining 120 selective access restrictions of the enrolled user 9 based on the fingerprint key 7. This determination 120 may involve searching access restriction data 18 that has data on enrolled user fingerprints 14 that can be used to match (or otherwise confirm the presented fingerprint/fingerprint key 7). In turn, the matched enrolled fingerprint and corresponding selective access restrictions 13 can be determined from a mapping table, library, or other data structure.

In response to determining the selective access restrictions, the method 100 includes enabling the host device 2 selective access to user data 16 in the storage medium 3. This is enabled by the FTL module 5 receiving a corresponding portion 17 of the logical to physical (L2P) table 19. The corresponding portion 17 is associated with, and in some examples exclusive to, the enrolled user 9. The corresponding portion 18 maps where user data 16 of the enrolled user 9 can be written, read, and erased physically at the storage medium 3.

To prevent the enrolled user 9 from accessing other user data 22, other portions 21 of the L2P table 19 associated with other users 25 are not provided for use by the FTL module 5 during the session. This effectively disables access to other user data 25 (and memory units associated with the other user data 25).

It is to be appreciated that other selective access restrictions can be implemented as will be described with reference to examples below.

Data Storage Device 1

FIG. 1 illustrates a schematic of a data storage device 1 connected to a host device 2. The data storage device 1 may be connected to communicate with the host device 2, such as via a physical data cable 20. This can include a DSD 1 in the form of a portable device that can be used (at separate times) with more than one host device 2. In some examples, the DSD 1 may be in wireless communication with the host device 2, either directly, or via a communications network (not shown). The DSD 1, in some examples, is a portable data storage device utilizing flash memory storage as the storage medium 3.

Controller

The DSD 1 includes a controller 30 that includes one or more processing devices configured, individually or in combination, to perform one or more operations on the DSD 1. This can include executing instructions from firmware and/or to perform operations on the DSD 1. This can include functions, such as those of known DSD and SSD controllers such as communication with the host device 2, wear leveling, error correction, garbage collection, etc.

Although the flash translation layer module 5 is schematically illustrated as a separate item to the controller 30 in FIG. 1, it is to be appreciated that in some examples the function of the FTL module 5 is provided by the controller 30 (as a hardware component) operating firmware or software. That is, the main controller/processor 30 of the data storage device 1 is also the processor used to conduct fingerprint authentication/FTL module functions. In alternative examples, the flash translation layer module 5 includes a separate hardware module to a separate controller 30 that operates other functions.

The DSD may be configured so that the controller 30 is part of the data path from the storage medium 13 to the host device 2.

Communication Interface 4

A communication interface 4 is provided to facilitate communication between the data storage device 1 and the host device. This can include hardware components, such as connectors and input and output circuits to enable a physical cable 20 to connect and communicate between the DSD 1 and host device.

In some examples, the communication interface 4 enables communication via a USB (Universal Serial Bus) standard cable and connector. This can include one or of the USB-A, USB-B, USB-C standards. In other examples, this can include a communication interface to enable communication via eSATA (external serial advanced technology attachment), and eSATAp (power over eSATA), standards. In yet other examples, this can include a communication interface to enable communication via FireWire standards. In yet further examples, this can include a communication interface to enable communication via Thurderbolt standards.

In other examples, the communication interface 4 may include a wireless communication interface to enable wireless communication with the host device 2, which can include communication via WiFi protocols.

Flash Translation Layer Module 5

The flash translation layer module 5 is configured to map logical block addresses (used at the host device 2 side) to physical addresses in the storage medium 3. As noted previously, the FTL module 5 may functionally be implemented at the controller 30 or may be a separate hardware module.

Importantly, the FTL module 5 in this example is configured to operate with selective access associated with enrolled users. This can include restrictions on how the data storage device 1 is used and operated. Such selective access restrictions can include one or more of the following:

a. Restrict access to portions of the L2P table 19 that are not associated with selective access restrictions of the received fingerprint key 7 of the enrolled user 9;

b. Restrict access to only partitions of the storage medium 3 in accordance with selective access restrictions 13 of the enrolled user 9;

c. Specifying physical blocks 35 that can be used by the enrolled user 9 for read, write, or erase function for user data 16;

d. Specify characteristics of physical blocks 35, such as block health, that should be prioritized for writing user data 16 of the enrolled user;

e. Specify one or more operating protocols for the session;

f. Specify one or more firmware for the session;

g. Specify one or more data protection operation modes for user data 16 stored in the storage medium 3;

h. Specify one or more garbage protection preferences 43 that affect user data 16 stored in the storage medium 3.

Importantly, at least some of the selective access restrictions is enabled by only allowing a portion 17 of the logical to physical table 19 associated with selective access restrictions 13 of the enrolled user (that provided the fingerprint key) to be available for use during the session. Thus during that same session, the other portions 21 of the L2P table 19 associated with another user 25 is unavailable such that read, write, or erase operations on user data 22 for those other users 25 is prevented.

Random Access Memory

The random access memory 28 can be used to temporarily store data during an operating session of the data storage device 1. This can include firmware, the L2P mapping table 19, selective access restrictions 13, fingerprint data 14, etc.

In some examples, the random access memory 28 includes a dynamic random access memory (DRAM) chip.

Storage Medium 3

Figure 3:
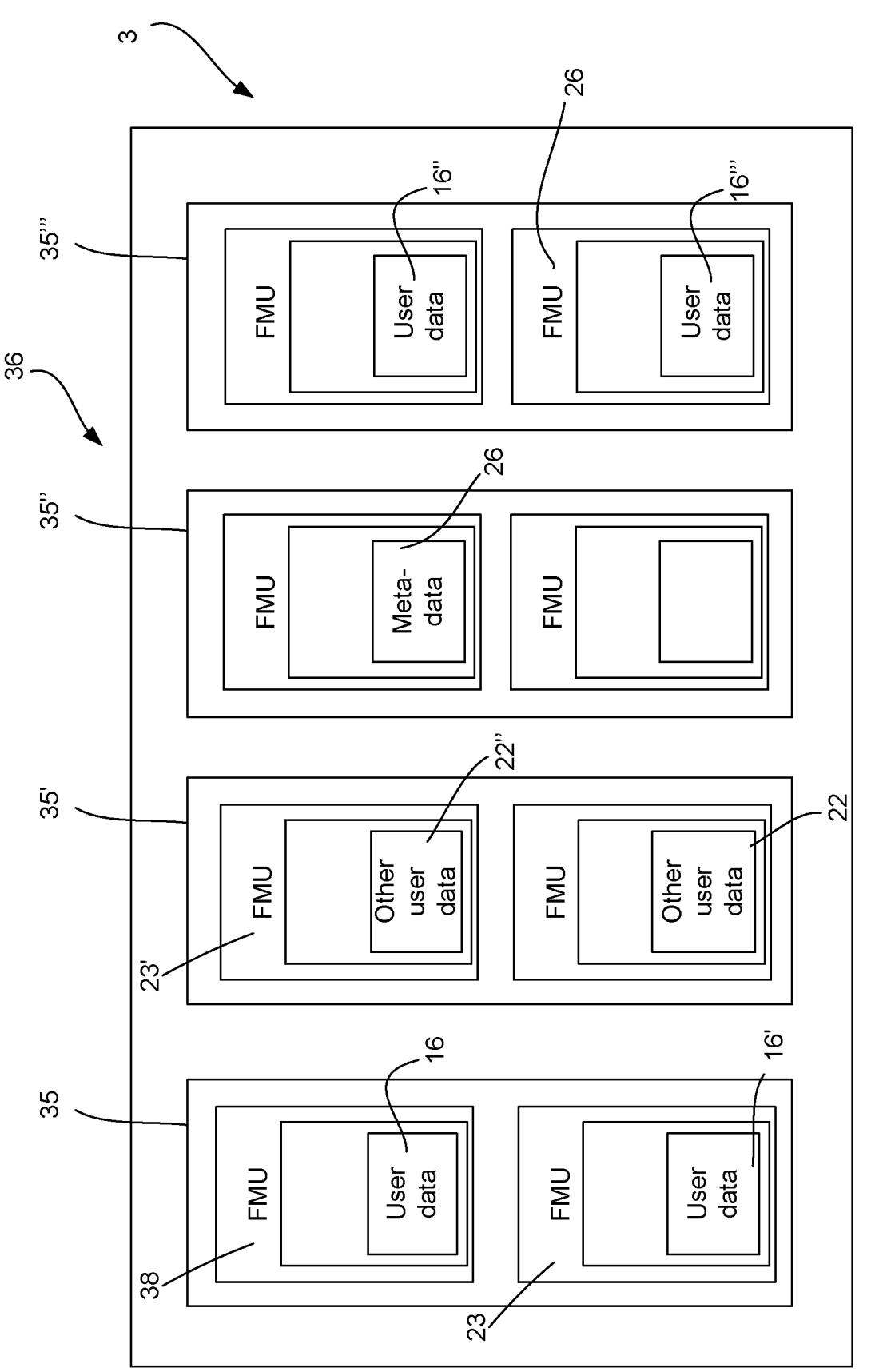
FIG. 3 is a schematic of storage medium 3 of a data storage device.

FIG. 3 illustrates an example storage medium 3 that includes flash memory (such as NAND flash). This may include a plurality of blocks 35, where each block is the smallest unit that can be erased. Each block contains a plurality of flash memory units (FMU) 38, where the FMU 38 is the smallest data chunk that the can be used to read or write to the flash memory. Because each block is the smallest unit that can be erased, to erase or modify data in one FMU 35 involves erasing at least an entire block and rewriting the block (or to a new block).

In one example, each FMU 38 may contain up to 4 KB of data (from 8 sectors of 512 bytes for each sector). The storage medium 3 may be packaged in one (or more) units that are mounted to a circuit board via a ball grid array (BGA).

The storage medium 3 containing the plurality of blocks 35 have physical addresses associated with the blocks. As discussed herein, logical block addresses (which are used at the host device side) will need to be mapped to these physical addresses. This is achieved with the logical to physical table 19, which in examples described herein are selectively restricted.

As illustrated in FIG. 3, user data 16, 16', 16", 16''' of the enrolled user may be written to blocks 35, 35''' that are physically separated. In some examples, the physical address of these blocks 35 to be used for user data 16 may be specified (such as for block health reasons).

Referring to FIG. 1, and illustrated with logical separation, the storage medium 3 can be configured to store user data 16 of an enrolled user 9 as well as other user data 22 of other enrolled users 25.

In addition, the storage medium 3 may be configured to hold other data, such as metadata 26. The metadata 26 may include data used for operation of the data storage device 1. This can include firmware, logical to physical (L2P) tables 19, data related to selective access restrictions 18, fingerprint data associated with fingerprints 14 of enrolled users (and mapping of fingerprints to users), other data related to enrolled users, settings and configurations of the data storage device 1, data related to usage and health of the storage medium, age of data stored in the storage medium, and other parameters.

It is to be appreciated that the storage medium 3 may be configured as a non-volatile data storage for firmware, software, mapping tables 19, access restriction data 18, and other metadata 26. This can include data that would be loaded to RAM 28 during an operating session. This enable preservation of metadata when the data storage 1 is unpowered and not in use.

Fingerprint Sensor 11

The fingerprint sensor 11 is a biometric reader configured to read biometric data based on a fingerprint of a user. A fingerprint key 7 may be derived from this biometric data, which may include a cryptographic key derived from the biometric data.

In some examples, the fingerprint sensor 11 is a component of the data storage device 1 as illustrated in FIG. 4. That is, the fingerprint sensor 11 is integrated into the data storage device 1 and may be configured to pass sensor signals, representative of the scanned fingerprint/fingerprint key, to the FTL module 5 and/or controller.

The fingerprint key 7 can then be used, at least in part, for an authentication process to authenticate that the user is one of the enrolled users 9. Furthermore, the fingerprint key 7 can be used to determine selective access restrictions 13 during the session with the enrolled user.

Although the described example is described with reference to a fingerprint sensor, it is to be appreciated that in other examples other forms of biometric readers may be used. This may include sensors configured to read biometrics such as retina, iris, facial features, etc. This can include scanners that include cameras, or other image capture devices, LIDAR (light detection and ranging) scanners, etc.

In the above-described examples, the fingerprint sensor 11 is part of the data storage device 1. In alternative examples, a fingerprint sensor external to the data storage device 1 may be used. This may include an external fingerprint sensor that is associated with the host device 2, such as a fingerprint sensor integral to the host device 2 or alternatively an external fingerprint sensor that is a peripheral device to the host device 2. In such alternative examples, the fingerprint key 7 may be sent from such an external fingerprint sensor such that is it received by the data storage device. This can include sensing the fingerprint key 7 via the host device 2 and the communication interface 4.

In some examples, utilizing an external fingerprint sensor may provide redundancy in case the onboard fingerprint sensor 11 that is integral to the data storage device 3 fails. This alternative means of providing a fingerprint key 7 to obtain access to user data 16 can mitigate issues of potential hardware failure.

Host Device 2

The host device 2 can be a computer system, computer, laptop, tablet, smartphone, etc. In some examples, the host device 2 can include other electronic devices that is configured to host a data storage device 1. For example, a smart television, a gaming console, a security camera system, other data recording device, etc. This may be useful for cases where information needs be written and/or accessed securely based on the respective enrolled user 9.

When the host device 2 is used with the data storage device 1 for a given session, the enrolled user 9 needs to provide credentials to enable access to the storage medium 3. This can include providing their fingerprint to the fingerprint sensor so that the biometric details form a fingerprint key to enable selective access.

In further examples, additional factors of authentication may be used such as login and password that are entered at a user interface of the host device 2.

To enable this process, some examples include use of additional software, such as a driver, to enable these functions (as will be discussed below). In some examples, the additional software may be used during enrolment and administrative changes with the data storage device 1.

In some examples, once enrolled, during routine use of the data storage device 1, the enrolled user may interface with the fingerprint sensor 11 to enable access to the data storage device 1. That is, no specific software at the host device 2 is required during such use and at the host device side 2, the data storage device 2 appears as a removable data storage device 1 where user data 16 can be read, written, or erased. This can increase flexibility as a user 9 can use the data storage device 1 at various host devices 2 without having to use specific software at each host device 2.

In other examples, in particular where additional security and functionality is required, the data storage device 1 may be configured to only enable access if the host device 2 has the requisite software or driver. Such examples may include a handshake process between a processing device at the host device 2 and a controller of the data storage device 1.

Method 100

Examples of using the data storage device 1 will now be described. The data storage device 1 is configured to enable usage by multiple users and, if desired, multiple respective host devices 2. Normally, us of the data storage device 1 is limited to one user 9, 25 at a time during a session. A session typically commences at, or shortly after, an enrolled user presents their enrolled fingerprint to the fingerprint sensor 11 so that the data storage device 1 commences operation with the respective access restrictions 13. If another user uses the device, the session for the first user ends and the next user starts their session by presenting their fingerprint to enable operation with that next user's selective access restrictions.

Figure 7:
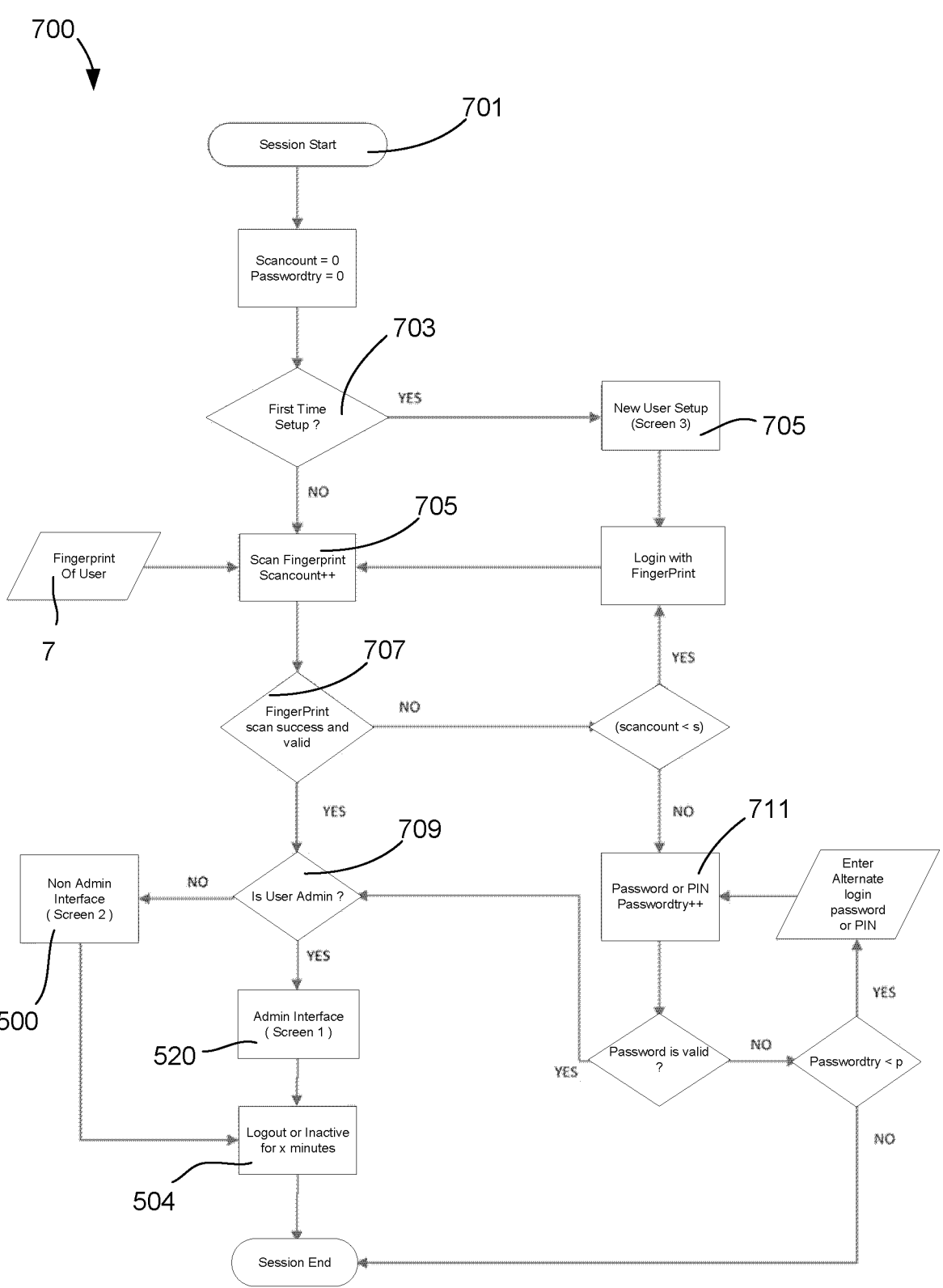
FIG. 7 illustrates a process of a user login for a session.

A flow diagram of a process 700 between a user 9 and the graphical user interface during a session is illustrated in FIG. 7.

Enrolment

Enrolment of users will now be described with reference to FIG. 7 as well as FIGS. 5(*a*) to 6(*c*) that illustrate a graphical user interface 600 at the host device 2.

In this example, the graphical user interface 200 is generated from driver software at the host device 2. In this example, the data storage device 1 requires the driver software and graphical user interface to enable at least enrolment functions.

When a session is first started 701, a query is made on whether this is the first-time setup 703. This is typically when there is a new device (or a device that has been reset) that does not have any enrolled users. On determination that there are no enrolled users, the process includes enrolling a first user 705 who automatically becomes the admin. FIG. 5(*a*) illustrates a graphical user interface 530 during new user setup. This includes four general steps including: (i) Set a username 531; (ii) Setup the user's fingerprint 532; (iii) Set alternate login method 533; (iv) Set partition size 534.

Setting the fingerprint can include presenting the user's fingerprint to the fingerprint sensor 11. The fingerprint data from the sensor 11 is sent to the processor that can include digitizing part of the fingerprint data to be associated with the username and then stored in the metadata 26 area of the storage medium 3. Optionally, an alternate login method 533 is setup for situations where a fingerprint cannot be presented for a session. In such cases, this can include providing a password, personal identification number (PIN), or other authentication means. This alternate login is also associated with the username. An example of a graphical user interface 620 to change the alternate login mode is illustrated in FIG. 6(*b*).

The setup further includes setting/modifying a partition size 531 and an example of a corresponding graphical user interface 610 is illustrated in (a). This includes showing remaining space 611 that is unallocated and available for allocating in partition(s) of users of the device. This also include showing remaining free space 612 in the user's current partition so the user can make an assessment on adjustments on the partition size. Finally, there is a partition size adjustment interface 613 to enable the user 9 to increase or decrease the partition size.

In response, the data storage device will map the username and/or the user fingerprint to the allocated user partition. This can involve the enrolled user fingerprint data 14 and the L2P mapping table 19 of the user being stored in a fingerprint user mapping table that forms part of the metadata 26.

This process completes the setup of a first user, as an admin. The setup process for additional users is similar, albeit permission from the admin is required to enable the setup process as will be discussed below.

Settings and Management User Interface 500, 501

FIG. 5(*a*) illustrates the user interface 500 for an admin to conduct administration and settings functions during a session. FIG. 5(*b*) illustrate the user interface 520 for non-admin users to change their settings.

Both the admin and non-admin users have the following options (in addition to read/write access to their partitions). Firstly, to modify 501 the partition size, which involves the same, or similar, process to setting up the partition size 531 described above with reference to the user interface 610 of FIG. 6(*a*). They can also modify 502 the alternate login mode. An example of this is illustrated in user interface 620 of FIG. 6(*b*) where the user is illustrated details 621 of the current alternate login mode and provide an option 622 to modify the alternate login mode and or password/PIN.

The user is also provided an option to modify 503 the fingerprint. This is illustrated in the user interface 630 in FIG. 6(*c*) where the user can enter a password/PIN to enable change of the fingerprint. The user can then provide an updated fingerprint that will then be used, in turn, to update the enrolled fingerprint data 14 used for mapping in the metadata 26.

Finally, both users are provided details 505 of the remaining capacity of the data storage device and an option to logout 504 to end the session.

The admin is also provided additional privileged to non-admin users as shown at the lower portion of user interface 500. This includes an option 506 to add additional users. On selection of this option, the user interface changes to user interface 530 to enable a new user to enter their details and present their fingerprint for enrolment. The admin is also provided the option 507 to remove users. Finally, an admin can give 508 other users admin privilege or to remove admin privileges of another user.

Login for a Session to Manage the Data Storage Device

The process of a user login for a session will be described with reference to FIG. 7. At the start of the session 701, the device will determine that this is not a first time set up and will then proceed to scanning fingerprints 705.

On determining that valid fingerprint key is received from the fingerprint sensor 11, the process includes determining 709 if the fingerprint corresponds to an admin. If the user is an admin, the software is configured to present user interface 500 to the admin to manage the data storage device. If the user is a non-admin user, then user interface 520 is presented to the user to manage the data storage device.

Alternatively, if a valid fingerprint key is not received, the option of using the alternate login mode 711 with a password or PIN is provided.

Selective Access Restriction Based on Fingerprint

During normal operation, that is login by users using their fingerprint to provide the fingerprint key, the data storage device 1 and method operate to provide selective access restrictions based on the fingerprint. In addition to using the fingerprint as a means of authentication, the system also selectively restricts the access to portions 17, 21 of the L2P table 19 that provides additional security and privacy to data. This security is enhanced by having this determination done at the FTL module 5 level at the data storage device 1 (instead of the host device 2). As details of the L2P table 19 are restricted at the data storage device, this can restrict an unauthorized user from accessing or copying user data from the storage medium.

In some implementations, this restriction means that other users are not aware of existence of other partitions (other than the partitions the user has access to). The admin may be aware of other partitions (e.g. know of the username and the logical partitions in the drive) but will not be provided selective access to read the data in partitions where they are not an authorized user. That is, some portions of the L2P table 19 will also be restricted from the admin so that an admin cannot read other user's data.

It is to be appreciated that a single enrolled user 9 may enroll multiple fingerprints where different fingerprints correspond to different functions. For example, the enrolled user 9 may use a right-hand index finger for a first partition to store user data related to a first project and use a left-hand index finger for a second partition to store data related to a second project. This can be useful in cases where separation of data is important (for examples, where the first project has data relevant to a first client that should not be mixed with data in the second project that belongs to another client).

In other examples, the multiple fingerprints may also be used for other settings and preferences. For example, say there is a third project that is of high importances and additional data endurance, data protection, and/or data security is required. The user may then enroll, say their right-hand thumb, for this third project and have corresponding selective access restrictions 13 that specify requirements such as one or more of: physical block health, operating protocols, firmware, data protection operation modes, garbage collection, TRIM, etc.

User Partitioning and Security

One exemplary use of selective access restrictions 13 is to provide each user with respective user partitions 31, 31', 31" for their respective user data 16. In some examples, the user partitions 31 are logical partitions 33 wherein the logical partition 33 is defined, at least in part, in the corresponding portion 17 of the logical to physical table 19. That is, access to the logical portion 33 is only allowed if the enrolled user 9 has been authenticated with their fingerprint key 7. This is controlled by providing selective access to the relevant portion 17 of the L2P table 19.

Thus the method 100 may include reading, writing, or erasing 150 user data in the logical portion 33 based on mapping of the corresponding portion 17 in the L2P table 19 as illustrated in e.

Since other users 25 do not have access to the enrolled user's portion 17 of the L2P table 19, those other users 25 will be unable to access the enrolled user's partition 31, 33.

When the backend (e.g. the FTL module 5 or controller) determines to restrict a portion of logical region (as determined by a fingerprint), it will restrict the corresponding L2P portion 17 (L2P table values associated to the restricted logical portion 33). It may have flag or similar means to not fetch or flush L2P pages for the restricted area thereby sanitizing the flow. Based on R/W/RW (read, write, read, and write) or admin permissions, the device 1 will put the L2P restriction for the corresponding paths R/W/RW. It may signal a typical out of range error for the host requests in case host device 2 makes an erroneous request. Further, the device shall refresh its L2P handling logic once the fingerprint login changes wherein, the restricted pages are released, and new pages are restriction thereby restricting the associated logical regions.

In some examples, the user partition 31 specified by the selective access restrictions 13 may include specifying particular physical blocks 35 of the storage medium. That is, the user partition 31 may also include physical partitioning. This may also include these specified physical blocks being defined in the corresponding portion 17 in the L2P table 19.

Figure 8:
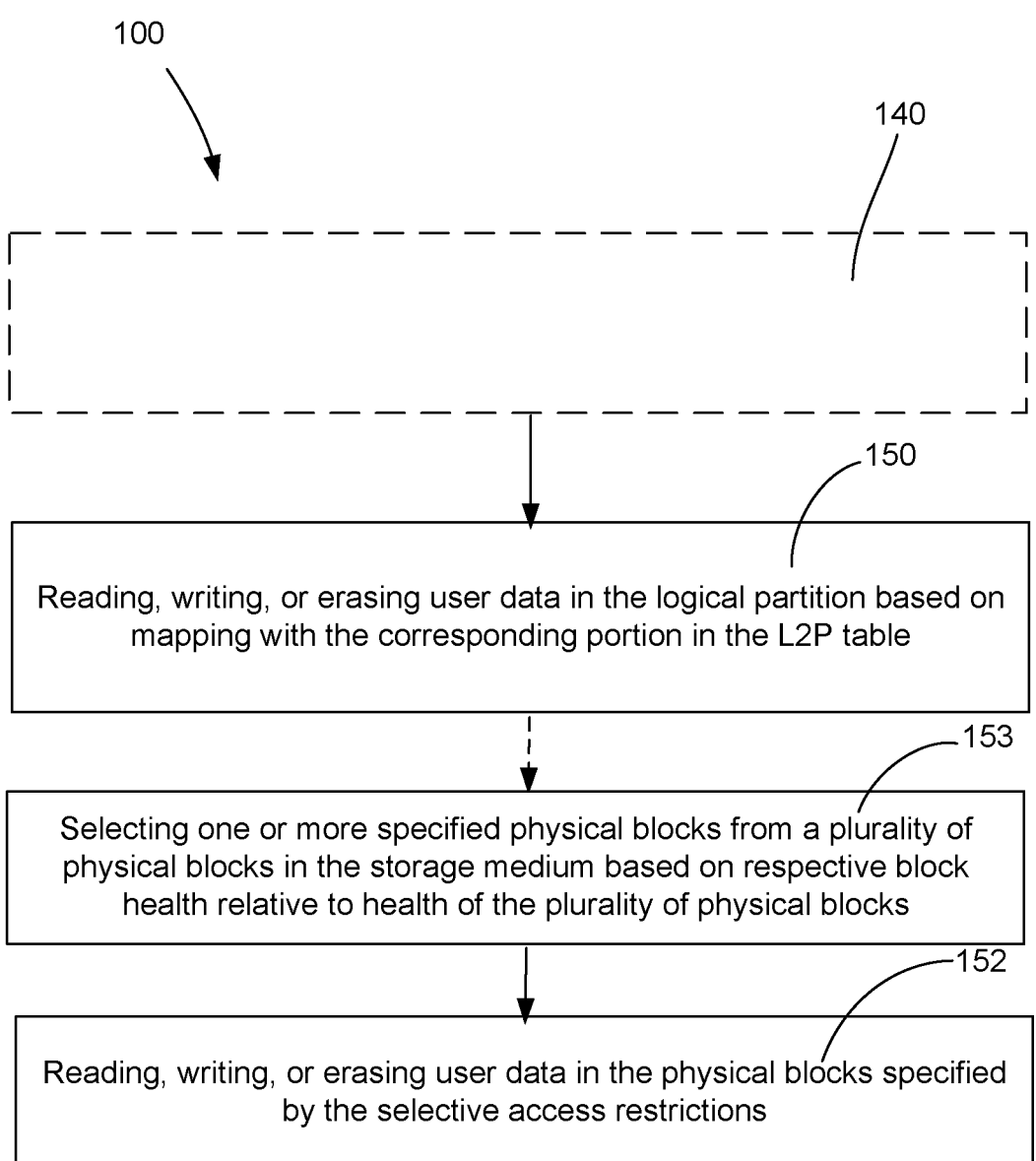
FIG. 8 illustrates steps to enable access to a logical partition and physical blocks in the data storage device based on selective access restrictions associated with a fingerprint key.

Thus the method 100 may include reading, writing, or erasing 152 user data in the physical blocks 35 specified by the selective access restrictions as illustrated in FIG. 8.

Enhanced Endurance—Routing Data to Healthier Physical Blocks

In some examples, the selective access restrictions are associated with enhanced endurance features. Based on the predetermined fingerprint/user settings, the data storage device 1 can increase the endurance of the user data associated to a login through a given fingerprint, wherein, the device would route them to healthier blocks compared to default routing.

This may be useful if user data of a particular enrolled user 9 should be given priority to healthier physical blocks 35. Thus in some examples, the specified physical blocks 35 are selected based on respective block health relative to the health of the plurality of physical blocks 36 in the storage medium 3. In some examples this can include specifying specific physical blocks. In other examples, this can involve specifying a class of physical blocks (e.g. blocks in the "healthiest" high endurance block category).

This can be useful to provide protection of incoming streaming data to be saved to the data storage device 1. For example, for one of the fingerprint-based logins, say master fingerprint of the user, the FTL module 5 routes the data to high Endurance blocks as well as with more than default XOR parity protection in the backend. In another use case, the device stays with default protection and/or default Endurance NAND blocks for a second fingerprint of the user. Likewise, the device exposes specific regions, controls the security aspects, storage aspects (admin, or in another example RO (read only)) as well as routing and parity aspects based on the fingerprint.

Thus the method 100 may include selecting 153 one or more specified physical blocks 35, from a plurality of physical blocks 36 in the storage medium 3, based on respective block health relative to health of the plurality of physical blocks 36 in the storage medium 3.

This step may be performed during partitioning of the data storage device 1 for a user, such as during new user setup or when the partition size is being modified.

Protocol Selection

In some examples, the selective access restrictions may include, in part, one or more selected operating protocols 37. The operating protocols 37 are associated with respective functions of the data storage device. Examples of operating protocols may include one or more of:

communication protocol(s) to enable communication between the data storage device 1 and the host device 2;

physical communication modes to enable communication between the data storage device 1 and the host device 2; and operating modes based on specified preferences.

Figure 9:
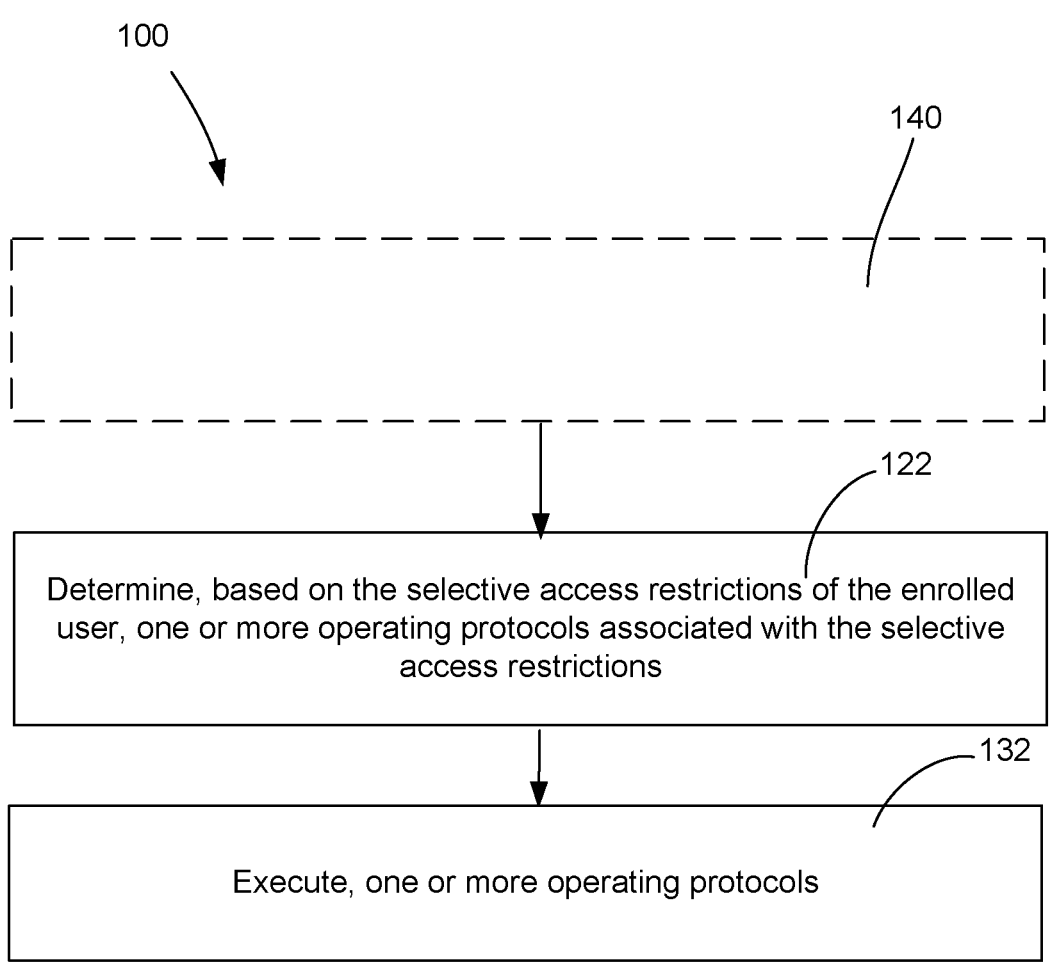
FIG. 9 illustrates steps to enable operating protocols based on selective access restrictions associated with a fingerprint key.

Thus in some examples, as illustrated in FIG. 9, the method 100 may include determining 122, based on the selective access restrictions 13 of the enrolled user 9, one or more operating protocols 37 associated with the selective access restrictions 13.

In response to the determined one or more operating protocols, the data storage device 1 is configured to enable executions 132 of the one or more operating protocols.

This can be useful in a multi-protocol device (for example a device having serial/parallel/duplex communication channels). Thus the method may include enabling a user to choose a default interface or interface requirement. In some implementations, based on the received fingerprint, only a particular mode of operation may be enabled, for example Thunderbolt. Thunderbolt is a multi-protocol device that integrates both USB and PCIe express interfaces in the same flash device. The fingerprint may be used as a trigger to enable the device to operate in certain restricted modes based on end-user preferences. Although Thunderbolt is used in this example, is to be appreciated other communication protocols could be specified. Such specification may be done during initial user setup or in the settings management user interface.

Firmware Selection

In some examples, fingerprints are also used to switch between multiple firmware variations available to the data storage device 1. The user can choose one of the firmware to provide desired available functionalities of the device. Accordingly the data storage device 1, or part thereof, will boot with the desired firmware based on the users' specific use-case. The chosen firmware could enable/disable different available internal hardware IP (intellectual property core) of the storage device like command aggregators, data aggregators, encoding & decoding hardware IPs, etc. for the required use-case. Such use-case can include, but is not limited to:

Enhanced security of the user data, where firmware can make use of an additional hashing engine/algorithm before storing the data.

Error handling, where based on different environmental conditions that affect the data stored in the device, firmware can make use of specific sensors. The firmware and device may thereby use specific error handling mechanisms to handle any possible data loss situations.

Improved random write performance in a device, where firmware can make use of the HAWA (Hardware Accelerated Write Aggregation) module.

Figure 10:
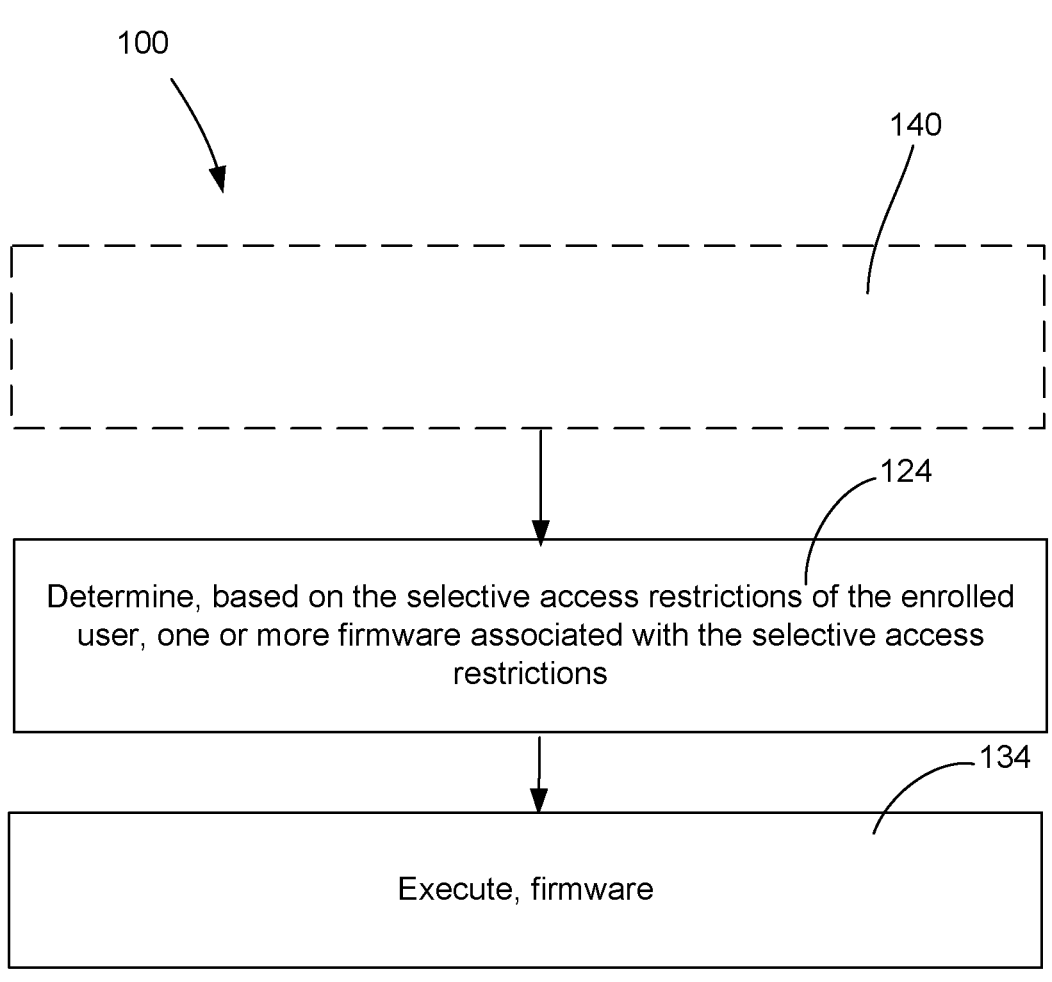
FIG. 10 illustrates steps to enable execution of firmware on the data storage device based on selective access restrictions associated with the fingerprint key.

Referring to FIG. 10 the method 100 further includes determining 124, based on the selective restrictions 13 of the enrolled user 9, one or more firmware 39 associated with the selective access restrictions 13. The one or more firmware 39 may be selected during the enrolment process by the user 9 so that a specific selection is not required for each session but is instead preselected. In response to the determined firmware 39, the method includes the data storage device executing 234 the determined firmware 39.

In some examples, in particular where only one firmware is available in accordance with the selective access restrictions 13, the one firmware is executed automatically. In other examples where multiple firmware are available in accordance with the selective access restrictions, a prompt in the graphical user interface may be provided to enable user selection of a particular firmware. In yet further examples, a preferred firmware from the multiple firmware may be run automatically if the user does not specify a selection.

Enhanced Protection

In some examples, the selective access restrictions 13 may be associated with protections settings or preferences for the user data 16. This can include specifying parity protection for the user data 16.

Based on the fingerprint settings, the device can support the parity protection with higher XOR bins in the FTL module 5 so that the data retrieval chances are vastly increased for certain logical regions associated to a user 9 and their fingerprint key 7.

Figure 11:
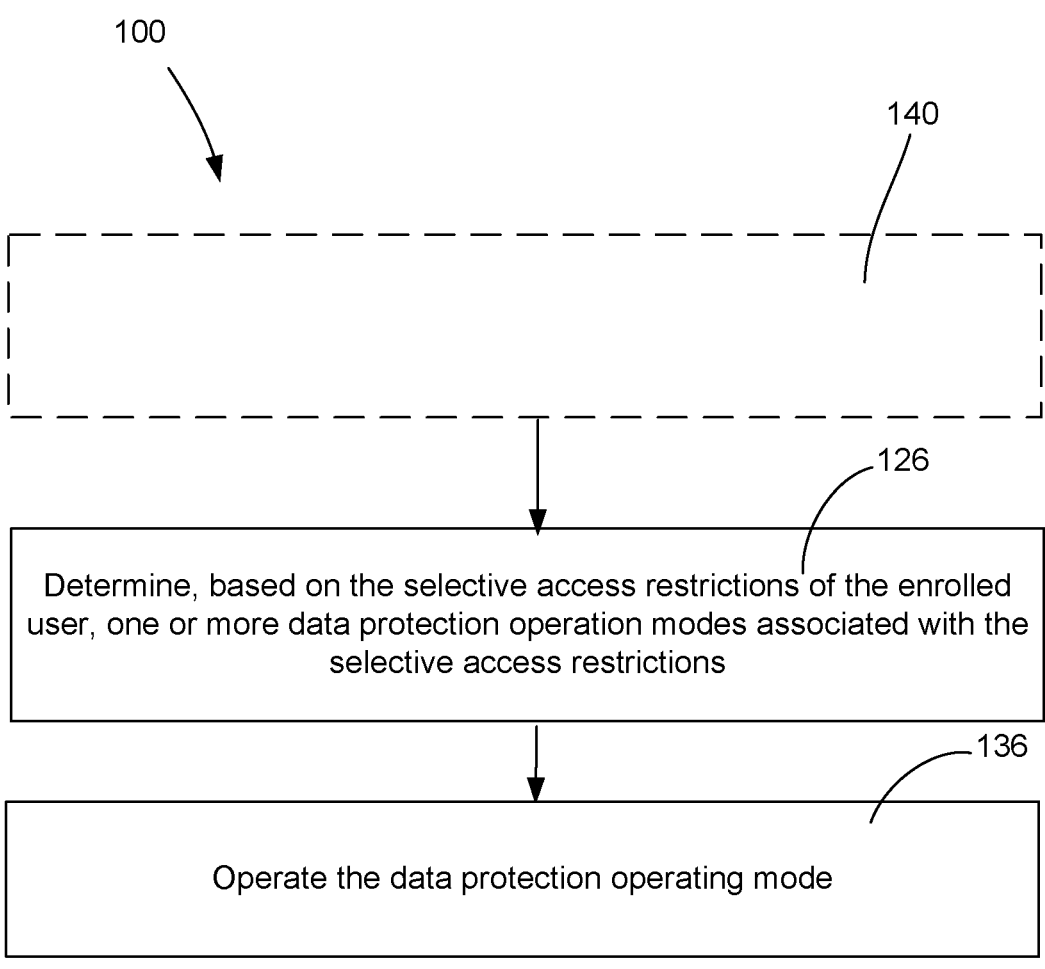
FIG. 11 illustrates steps to enable data protection modes based on selective access restrictions associated with the fingerprint key.

Referring to FIG. 11, the method further includes determining 126, based on the selective access restrictions 13 of the enrolled user 9, one or more data protection operation modes 41 associated with the selective access restrictions. In response to the determined data protection mode, the data storage device 1 is configured to operate 136 the determined data protection operating mode.

This can include using flash backend logic to protect the data by creating parity data. The amount of parity sometimes is referred as parity level that is also an indication of the level of protection. For example, using 400 bytes as parity for 4K of data is roughly 10% protection and higher than a case that involves 200 bytes parity for the same 4K data. In some implementations, the user of the fingerprint that is indicative of protection level can be passed to the backend to create the specified parity level for the data.

In some specific examples, the date protection operating mode includes RAID mechanisms. Thus in response to the user providing their fingerprint during use (and in conjunction with user settings), the device can manage its RAID mechanism or duplicate data consistent with user preferences. As an example, for a given fingerprint, the device duplicates at least one copy of data as another logical data owing to the importance of that data.

Garbage Collection Preferences

In some examples, garbage collection preferences may be specified in the selective access restrictions 13. Thus the data storage device 1 can also optimize garbage collection overheads when data of similar age can be routed to blocks of similar health thus optimizing the overall backend of the flash system.

Figure 12:
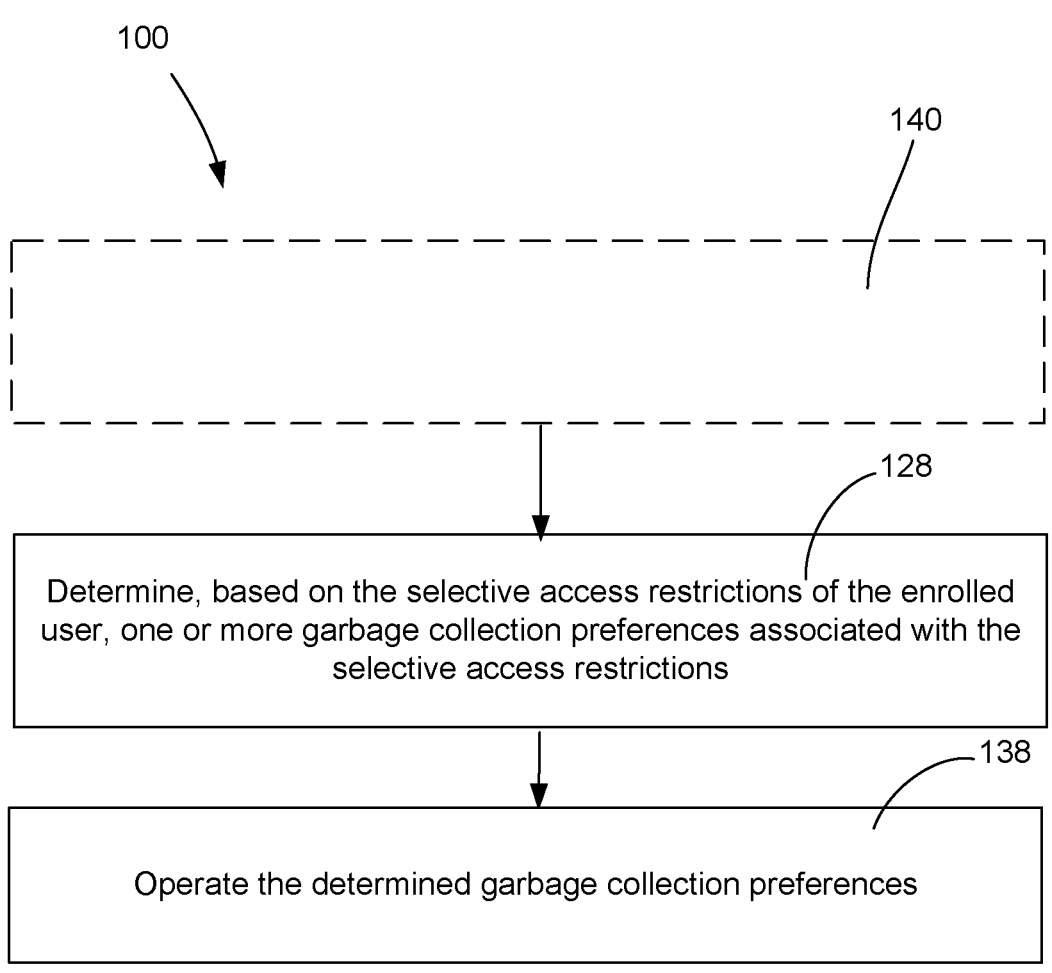
FIG. 12 illustrates steps enable garbage collection preferences based on selective access restrictions associated with the fingerprint key.

Referring to FIG. 12 the method further includes determining 128, based on the selective access restrictions of the enrolled user, one or more garbage collection preferences associated with the selective access restrictions. In response to the determined garbage collection preferences 43, the method includes operating 138 the determined garbage collection preferences.

In additional examples, the FTL module 5 in the data storage device 1 can provide a separate NAND trim (program/read voltage and latencies) for different partitions created out of respective separate fingerprints to enable better reliability for some set of data. This can include different fingerprints of the same enrolled user.

Advantages

The presently disclosed data storage device 1 and method can enable ease of accessing respective partitions of a user in a data storage device that is shared (or accessible) to multiple users. This can have particular advantages for an external and portable data storage device. This can increase security by having selective access restrictions that limit access to the logical to physical table 19. When performed at the flash translation layer (FTL) module 5 level inside the data storage device 1, this increase security as the host device 2 will not have access to portions of the L2P table 19 that shows the logical and physical spaces of other users.

In addition to ease of access, partitioning and security, the use of fingerprint keys 7 corresponding to fingers of a user 9 can also be used to select settings, preferences, or biases, that the user wants for user data 16. This enables customization on how the user wants to use the data storage device and an easy ability for a shared data storage device to switch between these settings, preferences, and operating modes.

Variations

Multiple Fingerprint Keys for a Single User

In some examples, the fingerprint key of the user may be used by the user to hint the nature of the data. As noted above, some examples enable a single user to enroll multiple fingerprint keys 7, whereby different fingerprint keys may be used to select different operating modes.

Thus in an illustrative example, an enrolled user 9 designate the fingerprint key 7 corresponding to their right-hand index finger for general use. The user may designate a fingerprint key 7 of their right-hand thumb for data of higher importance. In this example, either of the right index finger and right thumb can be used to enable access to the same logical partition 31 of that user. That is, the user can use either of the two digits to read the user data 16 and the FTL module 5 will have access to the same (or substantially the same) corresponding portion 17 of the L2P table 19. However, if the user has initiated the session with, say the right-hand thumb, then data written to the storage medium 3 may be biased to write to healthier physical blocks.

In other examples, the data storage device 1 has a fingerprint mapping for the data-age and routes all archive data into specific NAND blocks (blocks marked for cold data) and any scratchpad data to hot blocks. The end-user may use this feature (of different fingerprint keys) to indicate that the stored data is only for a temporary purpose and that it need not be relocated to a capacity block. In this case, each of the fingerprints indicate the data life requirements in a device. Likewise, data routing can be biased based on fingerprint inputs.

In another example, the data storage device 1 accepts three fingerprints of a single user 9 and may provide customization for each of them. For the first fingerprint, it may provide read only access of files in the system. For example, the user 9 is not the actual owner of the partition but has been given read access by the actual owner permitting enrolment of the first fingerprint of that user 9. For the second fingerprint, it may provide enormous data protection (say the user needs more data protection for their work documents in that logical partition). For the third fingerprint it may provide higher QoS (quality of service). For example, where the user needs more QoS for gaming applications.

Fingerprint and Read/Write Permissions

In further examples, multiple fingerprint keys 7 corresponding to different fingers of a user can be used to manage read and write permissions. The data storage device 1 manages different fingerprint keys in a fingerprint mapping table, each of them mapped against a logical area that needs exposure and optionally each of them having one or more storage restrictions among, write only (WO), read only (RO), read-write (RW) including admin rights to the device. The proposed system can be construed as partial login, customized or restricted login storage modes.

So in an illustrative example, the user 9 may nominate their right index finger, and corresponding fingerprint key 7, for read only access to user data in the logical partition 33. They can also specify, for example, that their left-hand thumbprint, corresponding to another fingerprint key 7, provides read-write access to that logical partition 33. In this way, the user can confidently specify whether they want the session to be read only or a read-write only.

This selection may be useful as a write-protect feature to prevent accidental changes to data. It may also be useful to prevent unauthorized changes to data, such as in situations where the user starts a session between the host device 2 and data storage device 1 for the purposes of enabling another user to physically use the host device 2 to read the user data 16, but not to modify that data.

Multiple Input Channels with Respective Partitions

In a further approach of the proposed system 10, users may have mutually exclusive write permissions on multiple partitions in the data storage device 1. To differentiate between which partitions, this may be achieved by specifying different input channels for respective different partitions. Advantageously, this can enable simultaneously access/use of the different partitions of the data storage device 1 post authentication by utilizing different input channels available to connect to the storage device—without having the user initiate a different session by presenting another fingerprint key 7.

In another example of the data storage device, a first partition is associated with a first user who has exclusive write permissions. A second partition is associated with a second user who has exclusive write permissions to that second partition. Thus a user cannot write to another user's partition. The data storage device can be configured with multiple input channels to enable simultaneous access to the storage device. This can involve the first and second users using respective different input channels for respective write access. This can include using their respective fingerprint for authentication to establish access through the channels.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A data storage device comprising:
a storage medium;
a communication interface to enable communication with a host device; and
a flash translation layer (FTL) module, wherein the FTL module is configured to:
  receive a fingerprint key of an enrolled user from a fingerprint sensor;
  determine selective access restrictions of the enrolled user based on the fingerprint key; and
  in response, enable the host device selective access to user data in the storage medium in accordance with the selective access restrictions, wherein:
    selective access is enabled by receiving a corresponding portion of a logical to physical (L2P) table associated with the selective access restrictions of the enrolled user; and
    access is disabled to other portions of the L2P table associated with selective access restrictions of other users.

2. The data storage device according to claim 1, wherein:
the data storage device is configured with at least one user partition for the enrolled user; and
the at least one user partition is a logical partition defined by the corresponding portion in the L2P table.

3. The data storage device according to claim 1, wherein:

the selective access restrictions specify physical blocks, and/or characteristics of physical blocks, in the storage medium to store at least part of the user data; and the specified physical blocks are defined in the corresponding portion in the L2P table.

4. The data storage device according to claim 3, wherein the specified physical blocks are selected based on respective block health relative to health of a plurality of physical blocks in the storage medium.

5. The data storage device according to claim 1, wherein the FTL module is further configured to:

determine, based on the selective access restrictions of the enrolled user, one or more operating protocols associated with the selective access restrictions, wherein:

the operating protocols are associated with respective functions of the data storage device; and in response to the determined one or more operating protocols, the data storage device is configured to enable execution of the one or more operating protocols.

6. The data storage device according to claim 5, wherein the operating protocols include one or more of:

one or more specified communication protocol(s) to enable communication between the data storage device and the host device;

one or more specified physical communication modes to enable communication between the data storage device and the host device; and one or more specified operating modes based on specified preferences.

7. The data storage device according to claim 1, wherein the FTL module is further configured to:

determine, based on the selective access restrictions of the enrolled user, one or more firmware associated with the selective access restrictions, wherein, in response to the determined one or more firmware, the data storage device is configured to enable execution of the determined one or more firmware.

8. The data storage device according to claim 1, wherein the FTL module is further configured to:

determine, based on the selective access restrictions of the enrolled user, one or more data protection operating modes associated with the selective access restrictions, wherein, in response to the determined one or more data protection operating modes, the data storage device is configured to enable operation of the determined one or more data protection operating modes.

9. The data storage device according to claim 1, wherein the FTL module is further configured to:

determine, based on the selective access restrictions of the enrolled user, one or more garbage collection preferences associated with the selective access restrictions, wherein, in response to the determined one or more garbage collection preferences, the data storage device is configured to enable operation of the determined one or more garbage collection preferences.

10. The data storage device according to claim 1, further comprising:

the fingerprint sensor, wherein the fingerprint sensor is configured to send the fingerprint key of the user to the FTL module.

11. The data storage device according to claim 1, wherein the data storage device is further configured to receive the fingerprint key of the user from the fingerprint sensor associated with the host device.

12. A computer-implemented method for selectively enabling access to user data in a storage medium of a data storage device, the method comprising:

receiving a fingerprint key of an enrolled user from a fingerprint sensor;

determining selective access restrictions of the enrolled user based on the fingerprint key; and in response to determining selective access restrictions, enabling selective access to user data in the storage medium in accordance with the selective access restrictions, wherein:

selective access is enabled by a flash translation layer (FTL) module receiving a corresponding portion of a logical to physical (L2P) table associated with the selective access restrictions of the user; and access is disabled to other portions of the L2P table associated with selective access restrictions of other users.

13. The computer-implemented method according to claim 12, wherein:

selective access restrictions of the enrolled user include access to at least one user partition for the enrolled user;

the at least one user partition is a logical partition defined by the corresponding portion in the L2P table; and the method further comprises:

reading, writing, or erasing user data in the logical partition based on mapping with the corresponding portion in the L2P table.

14. The computer-implemented method according to claim 12, wherein:

the selective access restrictions specify physical blocks in the storage medium to store at least part of the user data;

the method further comprises:

reading, writing, or erasing user data in physical blocks specified by the selective access restrictions; and the physical blocks are defined in the corresponding portion in the L2P table.

15. The computer-implemented method according to claim 14, the method further comprising:

selecting one or more specified physical blocks, from a plurality of physical blocks in the storage medium, based on respective block health relative to health of the plurality of physical blocks in the storage medium.

16. The computer-implemented method according to claim 12, the method further comprising:

determining, based on the selective access restrictions of the enrolled user, one or more operating protocols associated with the selective access restrictions, wherein the operating protocols are associated with respective functions of the data storage device; and in response to the determined one or more operating protocols, executing the one or more operating protocols.

17. The computer-implemented method according to claim 12, the method further comprising:

determining, based on the selective access restrictions of the enrolled user, one or more firmware associated with the selective access restrictions; and in response to the determined one or more firmware, executing the determined one or more firmware.

18. The computer-implemented method according to claim 12, the method further comprising:

determining, based on the selective access restrictions of the enrolled user, one or more data protection operating modes associated with the selective access restrictions; and in response to the determined one or more data protection operating modes, operating the determined one or more data protection operating modes.

19. The computer-implemented method according to claim 12, the method further comprising:

determining, based on the selective access restrictions of the enrolled user, one or more garbage collection preferences associated with the selective access restrictions; and in response to the determined one or more garbage collection preferences, operating the determined one or more garbage collection preferences.

20. A data storage device comprising:

means for storing data;

means for receiving a fingerprint key of a user;

means for determining selective access restrictions of the user based on the fingerprint key; and in response to determining selective access restrictions, means for enabling selective access to user data in the means for storing data in accordance with the selective access restrictions, wherein:

selective access is enabled by providing a corresponding portion of a logical to physical (L2P) table associated with selective access restriction of the user; and access is disabled to other portions of the L2P table associated with selective access restrictions of other users.

* * * * *